(12) United States Patent
Domon

(10) Patent No.: US 7,055,050 B2
(45) Date of Patent: May 30, 2006

(54) NETWORK SYNCHRONIZATION TECHNIQUE

(75) Inventor: Wataru Domon, Tokyo (JP)

(73) Assignee: NEC Corporation, Tokyo (JP)

( * ) Notice: Subject to any disclaimer, the term of this patent is extended or adjusted under 35 U.S.C. 154(b) by 546 days.

(21) Appl. No.: 10/170,540

(22) Filed: Jun. 14, 2002

(65) Prior Publication Data

US 2003/0014679 A1 Jan. 16, 2003

(30) Foreign Application Priority Data

Jun. 15, 2001 (JP) .............................. 2001-181220

(51) Int. Cl.
*G06F 1/12* (2006.01)

(52) U.S. Cl. ...................... 713/400; 713/500; 713/502; 713/503; 713/600

(58) Field of Classification Search ................ 713/500, 713/400, 502, 503, 600
See application file for complete search history.

(56) References Cited

U.S. PATENT DOCUMENTS

| | | | |
|---|---|---|---|
| 5,689,688 A | | 11/1997 | Strong et al. |
| 6,128,318 A | * | 10/2000 | Sato ............................ 370/503 |
| 6,148,051 A | * | 11/2000 | Fujimori et al. ............. 375/356 |
| 6,310,653 B1 | * | 10/2001 | Malcolm et al. ............ 348/537 |
| 6,326,824 B1 | * | 12/2001 | Hosoe et al. ................ 327/160 |
| 6,539,489 B1 | * | 3/2003 | Reinert ....................... 713/400 |
| 6,633,989 B1 | * | 10/2003 | Hollins ....................... 713/400 |
| 6,804,205 B1 | | 10/2004 | Nishimura et al. |
| 6,813,282 B1 | | 11/2004 | Domon |
| 6,895,009 B1 | * | 5/2005 | Stallkamp .................... 370/394 |
| 6,914,914 B1 | * | 7/2005 | Flood et al. ................. 370/503 |

FOREIGN PATENT DOCUMENTS

| | | |
|---|---|---|
| EP | 554485 A1 | 8/1993 |
| EP | 0 942 556 A2 | 9/1999 |
| EP | 0942556 A2 | 9/1999 |
| EP | 1047213 A2 | 10/2000 |
| EP | 1 052 793 A | 11/2000 |
| FR | 2793624 | 11/2000 |
| JP | 10/164105 | 6/1998 |
| JP | 11-261579 | 9/1999 |
| JP | 2000-32030 | 1/2000 |
| JP | 2000-307557 | 11/2000 |
| JP | 2000-341307 | 12/2000 |
| JP | 2001-94576 | 4/2001 |
| JP | 2001-308868 | 11/2001 |
| WO | WO 96/02098 A | 11/1996 |
| WO | WO 99/62216 | 12/1999 |
| WO | WO 01/22659 | 3/2001 |

* cited by examiner

OTHER PUBLICATIONS

Sato, Takashi, "Synchronizing Cycle Master to External Timing Information via Cycle Slave", IEEE P1394.1 documents, Jan. 26, 1998, pp. 1-14.

*Primary Examiner*—Thomas Lee
*Assistant Examiner*—Vincent Tran
(74) *Attorney, Agent, or Firm*—Foley & Lardner LLP

(57) ABSTRACT

A network synchronization method allows reduced frequency fluctuations due to synchronization control in a network. Each node connected to the network has time information individually varying in a period of T. A time master node periodically notifies its own time information to time slave devices. Each time slave node prepares update-possible time points having a period of T/N (N>1). When receiving master time information, each time slave node updates its own time information using the master time information at an update-possible time point just after the master time information has been received.

19 Claims, 14 Drawing Sheets

CYCLE TIME REGISTER

| SECOND_COUNT (7BITS) | CYCLE_COUNT (13BITS) | CYCLE_OFFSET (12BITS) |

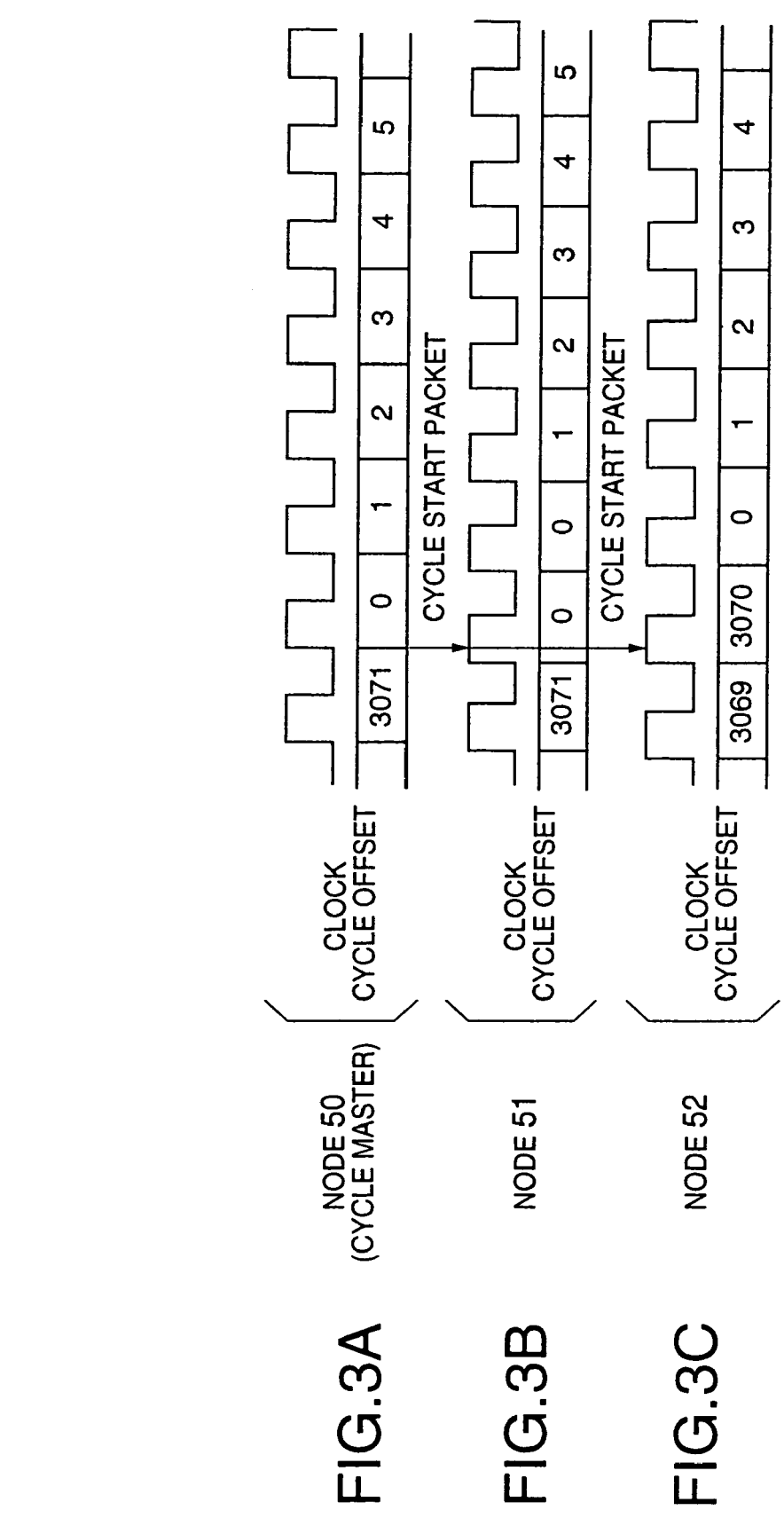

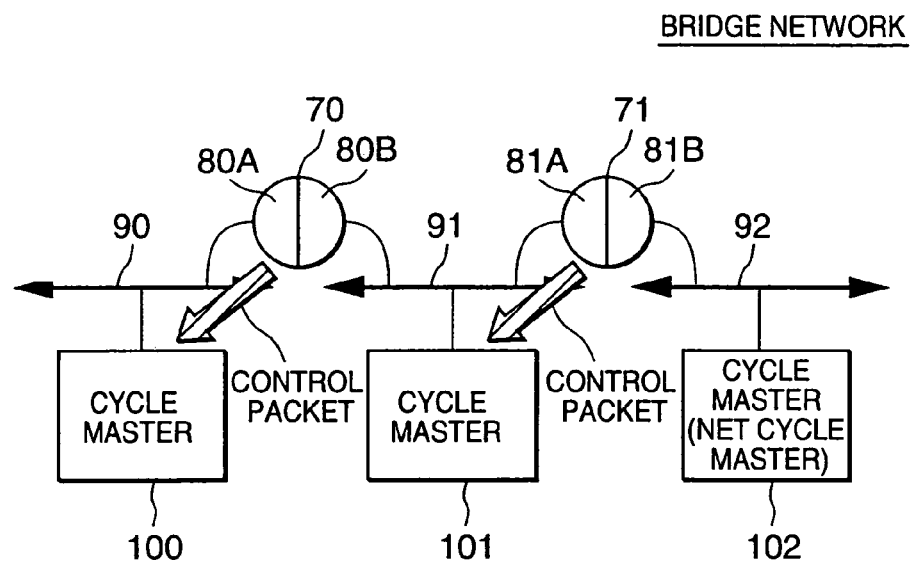

FIG. 18
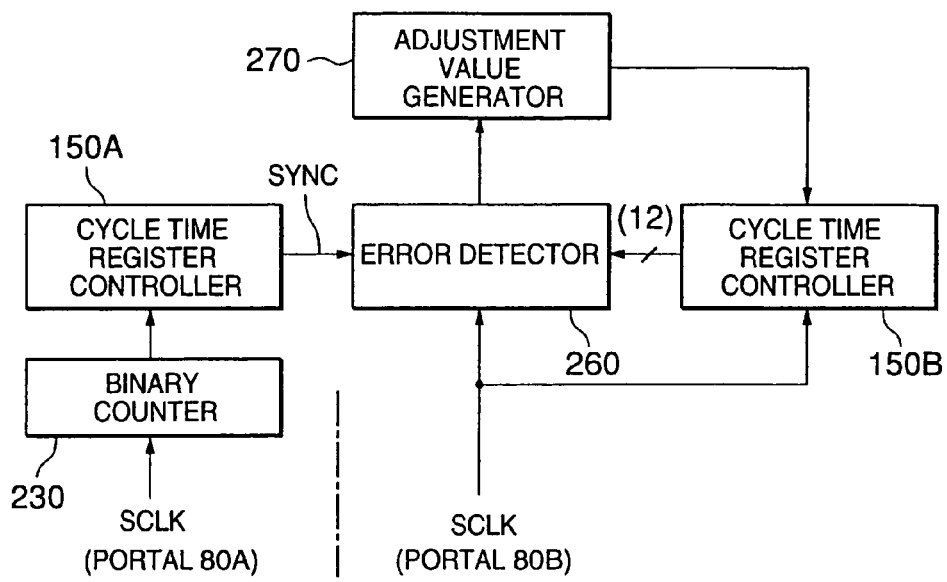
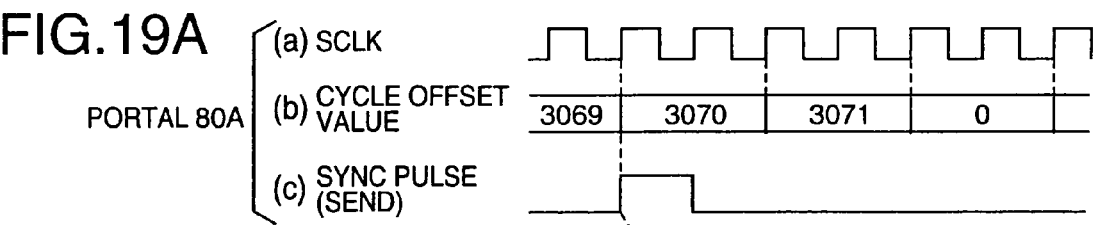
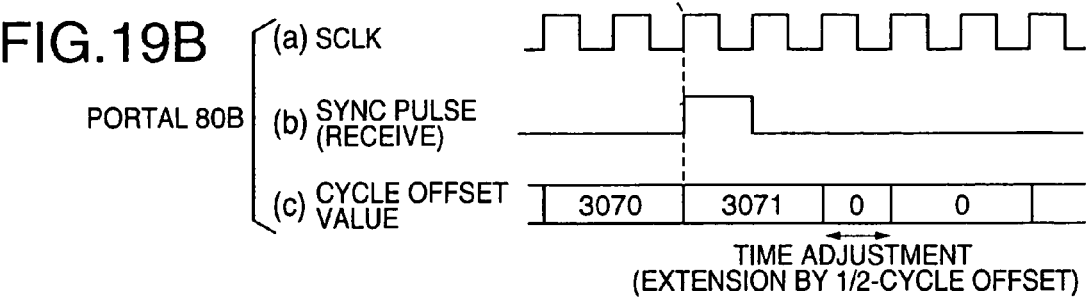

NETWORK SYNCHRONIZATION TECHNIQUE

BACKGROUND OF THE INVENTION

1. Field of the Invention

The present invention relates to a communication network allowing transport of real-time information such as motion picture in conformity with standard specification of a high-speed serial bus such as IEEE1394 Serial Bus Standard and, in particular, to network synchronization techniques allowing data communication among nodes connected thereto.

2. Description of the Related Art

The IEEE1394 standard is an international standard for implementing a cost-effective and high-speed digital interface. An IEEE1394 interface provides high-speed data transport of several hundreds of megabits per second, a high affinity for real-time transport required for digital video data transmission, and usability features. Accordingly, the IEEE1394 digital interface is caused to provoke widespread attention as a network interface for both computer peripherals and consumer electronics including digital video cameras and digital television sets.

FIG. 1, as a typical example, shows a network for data transport in conformity with the IEEE1394 standard. In general, the IEEE1394 defines physical layer, link layer, transaction layer, and serial bus management. On these layers an application layer is usually implemented as an upper layer. In FIG. 1, those layers that do not directly relate to the present invention are omitted for the sake of simplicity.

As shown in FIG. 1, an IEEE1394 network is composed of a plurality of nodes each having physical layer (PHY) device, which are connected in cascade through predetermined cables. Here, the port of PHY device 10 is connected to a port of PHY device 11 by a cable 60 and the other port of the PHY device 11 is connected to a port of PHY device 12 by a cable 61.

An IEEE1394 PHY device has a repeater function of inputting data on one port and outputting the data on all other ports thereof. Accordingly, the network of FIG. 1 is physically formed in tree topology but logically in bus topology. Hereinafter, a PHY device is referred to as a PHY LSI (large scale integration) because a PHY device is usually available as an LSI.

A PHY LSI operates according to a clock signal generated by an external crystal oscillator. In FIG. 1, the respective PHY LSIs 10–12 have crystal oscillators 30–32 attached thereto.

The resonance frequency $f_r$ of a crystal oscillator is 24.576 MHz with a permissible deviation of ±100 ppm (parts per million). The IEEE1394 standard defines transport rates: S100, S200, and S400, which correspond to $4 \times f_r$ (98.304 Mbits per second), $8 \times f_r$ (196.608 Mbits per second), and $16 \times f_r$ (393.216 Mbits per second), respectively. Since a clock signal at each node is in free-running state without frequency synchronization control, the PHY LSIs 10–12 may be operating in accordance with different clock frequencies within the permissible deviation of 100 ppm.

To achieve real-time data transport in such an IEEE1394 PHY circumstance, an isochronous cycle mode has been introduced in the IEEE1394 standard. In the isochronous cycle mode, only a node that has obtained a necessary bandwidth and gotten the right to transmit can transmit an isochronous stream packet. Since the isochronous cycle occurs in a period of 125 μsec, it ensures real-time transport of a stream of data.

The isochronous cycle starts after transmission of a cycle start packet, which is transmitted by a node functioning as a cycle master. In FIG. 1, it is assumed that the node 50 is the cycle master. The cycle start packet includes time information at which the packet itself was transmitted. A cycle time register provides this time information. In this example, the cycle master 50 writes a value of its own cycle time register 40 on a cycle start packet when transmitting it to the IEEE1394 bus.

As shown in FIG. 2, a cycle time register has a length of 32 bits, which is divided into 7-bit second count field, 13-bit cycle count field, and 12-bit cycle offset field.

The cycle offset field is a counter which counts according to a physical layer clock of 24.576 MHz such that a counter value is incremented by one from 0 to 3071 before resetting to zero and starting again. Accordingly, the counter value is reset to zero at intervals of 125 μsec.

The cycle count field is a counter which counts at intervals of 125 μsec. Its counter value is incremented by one when the cycle offset field is reset to zero, from 0 to 7999 before resetting to zero and starting again, and therefore it is reset to zero at intervals of 1 second.

The second count field is a counter which counts at intervals of 1 second. Its counter value is incremented by one when the cycle count field is reset to zero, from 0 to 127 before resetting to zero and starting again.

In general, a cycle time register (40, 41, 42) is implemented in a space of a control and status register (CSR) provided in the serial bus management (not shown). Accordingly, in FIG. 1, a link layer LSI (20, 21, 22) is separated from a corresponding cycle time register (40, 41, 42). However, the cycle time register is usually also implemented in the link layer LSI. The link layer LSI (20, 21, 22) operates according to a clock frequency of 49.152 MHz, which is twice the physical layer clock frequency of 24.576 MHz. In the link layer LSI, the clock frequency of 49.152 MHz is divided by 2 to produce the physical layer clock frequency of 24.576 MHz, which causes the cycle time register to operate.

Any node other than the cycle master receives the cycle start packet including the time information from the cycle master and overwrites a clock cycle offset value of its own cycle time register with the received time information to synchronize to the cycle master. In this manner, the contents of the cycle time register of each node are adjusted ever time the cycle start packet is received at intervals of 125 μsec so as to establish time information synchronization of all nodes.

For example, as shown in FIGS. 3A–3C, the time information synchronization is performed among the nodes 50–52. In this example, it is assumed that the PHY clock frequency of the crystal oscillator 31 in the node 51 is higher than that of the crystal oscillator 30 in the node 50 (cycle master) and the PHY clock frequency of the crystal oscillator 32 in the node 52 is lower than that of the crystal oscillator 30.

For the sake of simplicity, it is further assumed that the cycle start packet is transmitted when the cycle offset value of the cycle time register 40 is reset from 3071 to zero at the rising edge of the PHY clock and the time information written in the cycle start packet is a cycle offset value of zero, that the other nodes 51 and 52 receive the cycle start packet from the cycle master 50 without delay, and that the overwriting of the cycle offset at the nodes 51 and 52 is performed at the rising edge of the PHY clock.

At the node 51 operating at a higher clock frequency, as shown in FIG. 3B, the cycle offset value is continuously reset to zero twice, which means a delay of one clock, resulting in time adjustment with a maximum adjusted amount of one clock. Since one clock is about 40 nanosecond, frequency fluctuations (variations in cycle time register value) of up to about 320 ppm will occur with respect to a period of 125 μsec.

The contents of the cycle time register is used for real-time transport of audiovisual stream (AV stream) defined by IEC 61583 standard. To receive the AV stream, it is necessary for a receiving side to decode it by faithfully reproducing the video frame frequency and audio sampling frequency that were used at the transmitting side. However, these media-dependent frequencies do not synchronize with frequencies used in the IEEE1394 standard. To reproduce such frequency, the transmitting side transmits a packet of data attaching frequency information as a time stamp and the receiving side, when receiving the packet, looks at this time stamp to reproduce the frequency information. The IEC61883 standard defines that such time stamp information is determined depending on the cycle time register of the transmitting side.

However, when frequency fluctuations, that is, variations in cycle time register value occur at the receiving side due to the synchronization control of cycle time register as described above, the AV-stream-dependent frequencies such as sampling timing also vary, which adversely influences the quality of image and sound reproduced from the received AV stream. Therefore, an improved network synchronization technique is desired.

Further, in the P1394.1 working group of IEEE, efforts are moving ahead to make IEEE1394 bridge standardization for connecting a plurality of IEEE1394 buses to form a large network. In such a network environment, network-wide synchronization is needed to transfer real-time data over plural IEEE1394 buses, which will be described hereinafter with reference to FIG. 4.

As shown in FIG. 4, it is assumed that two bridges 70 and 71 connect three IEEE1394 buses 90–92, in each of which synchronization control is performed by a corresponding cycle master as described before. Since each cycle master is operating at its own clock frequency, a synchronization method is needed among the cycle masters to achieve network-wide synchronization.

In FIG. 4, a bridge has a plurality of portals, each of which is connected to a corresponding IEEE1394 bus. For example, the bridge 70 has portals 80a and 80B each connected to IEEE1394 buses 90 and 91. The IEEE1394 buses 90–92 have cycle masters 100–102 predetermined according to IEEE1394 standard. A portal may function as a cycle master because it also functions as an IEEE node. One of the cycle masters 100–102 is selected as a net cycle master that is a cycle master for the entire bridge network. Here, the cycle master 102 is designated as a net cycle master for the bridge network.

The other cycle masters 100 and 101 synchronize their own time information to the time information of the net cycle master 102 using the following procedure.

First, the portal 91B of the bridge 71 synchronizes its own time information to the net cycle master 102 using a cycle start packet received from the net cycle master 102. On the other hand, the other portal 81A of the bridge 71 synchronizes its own time information to the cycle master 101 using a cycle start packet received from the cycle master 101. Accordingly, the bridge 71 can detect a time deviation of the cycle master 101 from the net cycle master 102 by comparing the time information of the cycle master 101 to that of the net cycle master 102. When such a time deviation has been detected, the portal 81A transmits a control packet to the cycle master 101 to adjust the cycle time register of the cycle master 101.

As shown in FIG. 5, a control packet, which is also called a cycle master adjustment packet, is formed according to a special isochronous stream packet format having no data field. Because of no data field, the value of a data length field is zero. A combination of tag and channel fields designates this packet as a control packet for cycle time adjustment. Here, the tag and channel fields store "3" and "31", respectively. A transaction code (tcode) field stores "10" to indicate that this packet is based on the isochronous stream packet format.

A synchronization code (sy) field stores a value designating an amount to be adjusted in the cycle time register of a cycle master receiving this packet. For example, when the synchronization code (sy) field stores a value of 1, a cycle master that has received the control packet elongates a period of the following isochronous cycle (125 μsec) by one cycle offset of about 40 nanoseconds. On the other hand, when the synchronization code (sy) field stores a value of 3, a cycle master that has received the control packet shortens a period of the following isochronous cycle (125 μsec) by one cycle offset of about 40 nanoseconds.

In this manner, the cycle master 101 can operate the bus 91 with the isochronous cycle synchronizing to that of the bus 92 connected to the net cycle master 102. Therefore, the bus 91 synchronizes to the bus 92. Since the synchronization control for the bridge network is designed to synchronize the isochronous cycle periods, the values of second count field and cycle count field of a bus do not always coincide with those of another bus (see FIG. 2).

The bridge 70/performs the same synchronization control as the bridge 71. The bus 90 synchronizes to the bus 91 that synchronizes the bus 92. Therefore, all the buses 90–92 synchronize. Such a synchronization method is disclosed in Japanese Patent Application Unexamined Publication Nos. P2000-307557A and P2000-32030A.

The synchronization control in the bridge network is performed by-appropriately elongating or shortening a period of isochronous cycle (125 μsec) by one cycle offset of about 40 nanoseconds, resulting in an instantaneous frequency fluctuation of approximately 320 ppm when adjusted. In addition, the synchronization control in the bridge network is performed by sequentially establishing synchronization from a bus to the adjacent bus to synchronize all the buses. As described above, frequency fluctuations due to the above synchronization control of isochronous cycle within an IEEE1394 bus or a bridge network composed of a plurality of IEEE1394 buses adversely influence the quality of transmission of a received real-time stream. Especially, in the case of the bridge network, frequency fluctuations may be accumulated every time the synchronization control is performed for one bridge, resulting in a large amount of frequency deviation. It is the same with other communication networks having a function of notifying time information at regular intervals.

SUMMARY OF THE INVENTION

An object of the present invention is to provide a network synchronization method and system allowing reliable transmission system by reducing frequency fluctuations of isochronous cycle due to the synchronization control.

According to an aspect of the present invention, in a method for synchronizing a plurality of devices connected to a network, wherein the devices have time information individually varying in a predetermined time period of T, wherein a time master device that is one of the devices periodically notifies its own time information as master time information to time slave devices that are devices other than the time master device, said method includes the steps of: at each of the time slave devices, preparing update-possible time points having a period of T/N (N is ail integer greater than 1); receiving the master time information from the time master device; and updating its own time information using the master time information at an update-possible time point just after the master time information has been received.

According to another aspect of the present invention, a network device connected to a network, includes: a clock generator for generating a clock signal; a physical-layer circuit connected to the clock generator; and a link-layer circuit connected to the physical-layer circuit, wherein the link-layer circuit comprises: a timing generator for generating a first timing signal and a second timing signal from a system clock signal inputted from the physical-layer circuit, wherein the first timing signal is generated in a period of T and the second timing signal is generated at a time point corresponding to a period of T/N (N is an integer greater than 1); a time information memory for storing time information, which varies according to the first timing signal; and a controller controlling the time information memory such that, when receiving reference time information from the network, the time information stored in the time information memory is updated using the reference time information at a time point according to the second timing signal just after the reference time information has been received.

The timing generator may include: a frequency divider for dividing the system clock signal in frequency by two to produce the first timing signal having the period of T; and a frequency multiplier for multiplying the system clock signal in frequency by two to produce the second timing signal having a period of T/2.

The timing generator may include: a frequency multiplier for multiplying the system clock signal in frequency by two to produce a timing signal having a period of T/2; and a base-4 counter for counting from 0 to 3 according to the timing signal to produce the first timing signal every time the base-4 counter is reset to 0, wherein, when the reference time information has been received, the base-4 counter is reset to 0 to generate the second timing signal.

The timing generator may include: a binary counter for counting according to the system clock signal to produce the first timing signal every time the binary counter is reset to 0, wherein, when the reference time information has been received, the binary counter is reset to 0 to generate the second timing signal.

According to still another aspect of the present invention, a bridge connecting a plurality of networks, each of which individually has time information varying in a predetermined time period of T, includes: a first portal connected to a first network having first time information; a second portal connected to a second network having second time information; a time difference detector for detecting a time difference of the second time information with respect to the first time information; an adjustment value generator for producing a time adjustment value based on the time difference, wherein the time adjustment value is an integral multiple of T/M (M is an integer greater than 1); and a controller adjusting the second time information for the second network by the time adjustment value.

The adjustment value generator may include: a table containing a predetermined correspondence between time differences and time adjustment values, wherein the time adjustment values have a predetermined step of adjustment and an absolute value of a time adjustment value is restricted within a predetermined range, wherein the adjustment value generator produces a time adjustment value corresponding to the time difference by referring to the table.

A maximum absolute value of the time adjustment values may be a minimum value of integral multiples of the predetermined step of adjustment sufficient for adjusting a largest one of frequency deviations in local clocks of the network.

When an absolute value of the time difference exceeds a predetermined threshold, the time adjustment value may be set to a predetermined value beyond the predetermined range.

According to further aspect of the present invention, in a method for synchronizing a bridge network composed of at least one bridge having a plurality of portals each connected to different networks, each of which includes at least one node, wherein each of the portals and networks individually has a clock generator by which time information varies in a predetermined time period of T, wherein one of the portals is a master portal and the others are slave portals, said method includes the steps of; a) detecting a time difference of slave time information of each slave portal with respect to master time information of the master portal; b) producing a time adjustment value based on the time difference, wherein the time adjustment value is an integral multiple of T/M (M is an integer greater than 1); and c) adjusting the slave time information by the time adjustment value.

According to furthermore aspect of the present god invention, in a method for synchronizing a bridge network composed of at least one bridge having a plurality of portals each connected to different networks, each of which includes at least one node, wherein each of the portals and networks individually has a clock generator by which time information varies in a predetermined time period of T, wherein one of the portals is a master portal and the others are slave portals, said method includes the steps of: a) each of portals detecting a lowest clock accuracy in a corresponding network; b) dynamically determining a maximum adjustment value based on a network-wide lowest clock accuracy selected from lowest clock accuracies detected by the portals; c) detecting a time difference of slave time information of each slave portal with respect to master time information of the master portal; d) producing a time adjustment value within the dynamically determined maximum adjustment value based on the time difference, wherein the time adjustment value is an integral multiple of T/M (M is an integer greater than 1); and e) adjusting the slave time information by the time adjustment value.

BRIEF DESCRIPTION OF THE DRAWINGS

FIG. 3A is a timing chart showing a cycle start packet transmission operation of a cycle master in the IEEE1394 network;

FIG. 3B is a Liming chart showing an example of time information synchronization control of a node in the IEEE1394 network;

FIG. 3C is a timing chart showing another example of time information synchronization control of a node in the IEEE1394 network;

FIG. 4 is a block diagram showing an IEEE1394 bridge network for explaining synchronization control;

FIG. 5 a diagram showing the format of a control packet for cycle time register adjustment employed in the IEEE1394 bridge network;

FIG. 18 is a block diagram showing an internal circuit of a bridge according to a fourth embodiment of the present invention;

FIG. 19A is a timing chart showing an operation of inter-bus synchronization control in one portal of the ace bridge as shown in FIG. 18;

FIG. 19B is a timing chart showing an operation of inter-bus synchronization control in the other portal of the bridge as shown in FIG. 18;

DETAILED DESCRIPTION OF THE PREFERRED EMBODIMENTS

Hereinafter, preferred embodiments of the present invention will be described in detail with reference to the drawings.

First Embodiment

The overwriting of the cycle time register provided in a network device will be described when a cycle start packet has been received from a cycle master.

1.1) Link-Layer LSI

Figures 1, 2:
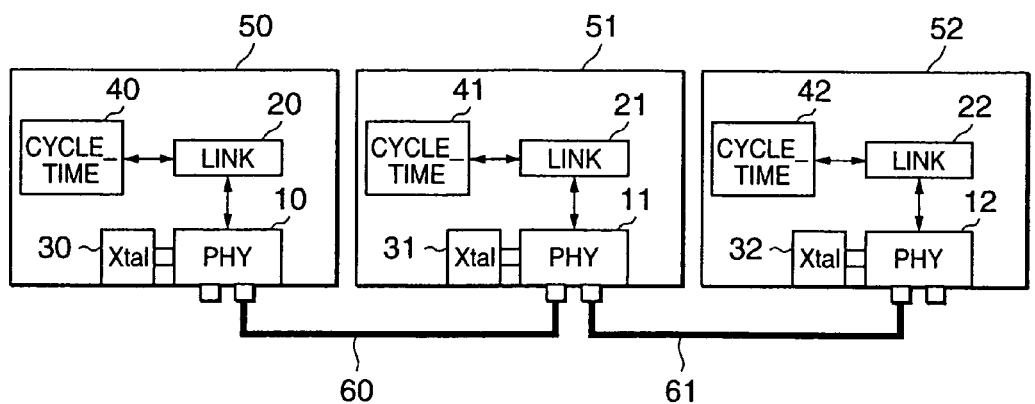
FIG. 1 is a block diagram showing an IEEE1394 network for explaining data transport in conformity with the IEEE 1394 standard.
FIG. 2 is a diagram showing the format of a cycle time register provided in a node of the IEEE1394 network.
Figure 6:
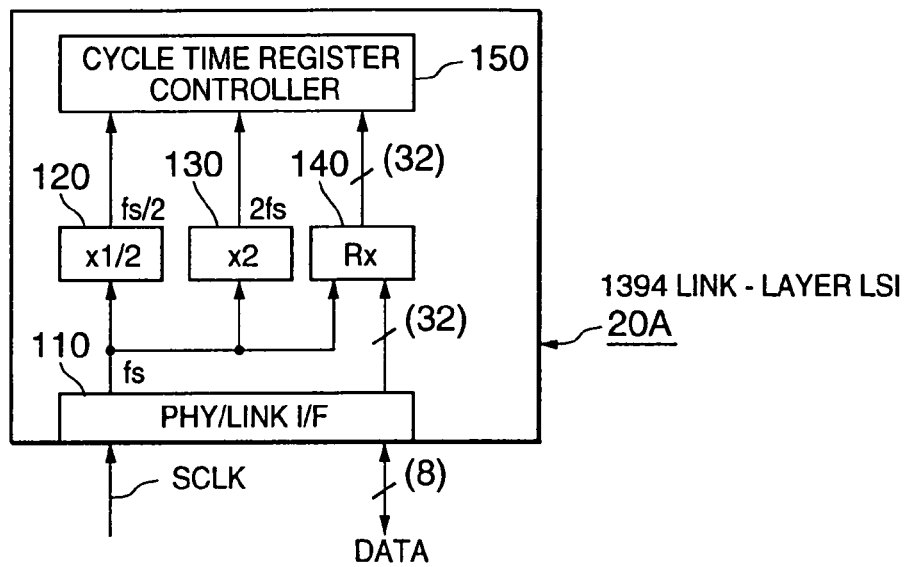
FIG. 6 is a block diagram showing a related internal circuit of an IEEE1394 link-layer LSI according to a first embodiment of the present invention.

Referring to FIG. 6, a 1394 link-layer LSI 20A is employed in a node of, for example, the IEEE1394 network as shown in FIG. 1. The 1394 link-layer LSI 20A is provided with a physical-layer/link-layer (PHY/LINK) interface 110 through which plural signals (e.g. in the neighborhood of nine kinds of signals) are inputted and outputted from and to the PHY LSI. In FIG. 6, however, only a system clock signal SCLK and data are depicted. The system clock signal SCLK is received from the PHY LSI. As for data, the PHY/LINK interface 110 is a bidirectional interface to the PHY LSI to exchange packets.

The 1394 link-layer LSI 20A operates according to the system clock signal SCLK, which has a frequency fs of 49.152 MHz, that is, two times the clock frequency of the crystal oscillator provided in the PHY LSI (see FIG. 1). The bit rate per data signal line is 49.152 Mbps. S100, S200 and S400 data are transferred using two signal lines, four signal lines, and eight signal lines, respectively. The cycle start packet is transferred in S100 and therefore two signal lines are used to receive it from the PHY LSI.

The system clock signal SCLK is output to a frequency divider 120, a frequency multiplier 130, and a packet receiver 140. The frequency divider 120 divides the frequency fs of the system clock signal SCLK by two to produce a fs/2 clock of 24.576 MHz, which is supplied to a cycle time register controller 150. The frequency multiplier 130 multiplies the frequency fs of the system clock signal SCLK by two to produce a 2 fs clock of 98.304 MHz, which is supplied to the cycle time register controller 150.

The PHY/LINK interface 110 converts a received packet of data into a 32-bit parallel signal and outputs it to the packet receiver 140. The packet receiver 140 performs bit-error check and packet type check of the input packet according to the system clock signal SCLK and distributes it to destinations depending on the packet type. Here, only the cycle time register controller 150 is depicted as one destination. When receiving the cycle start packet, the packet receiver 140 outputs time information included in the received cycle start packet to the cycle time register controller 150.

The cycle time register controller 150 is a functional block that controls the value of the cycle time register depending on the time information inputted from the packet receiver 140 and the ½ fs clock and the 2 fs clock from respective ones of the frequency divider 120 and the frequency multiplier 130.

The internal circuit of the 1394 link-layer LSI 20A is integrated in a circuit block. In FIG. 6, only blocks related to the present invention are depicted for the sake of simplicity.

1.2) Cycle Time Register Control

Figure 7:
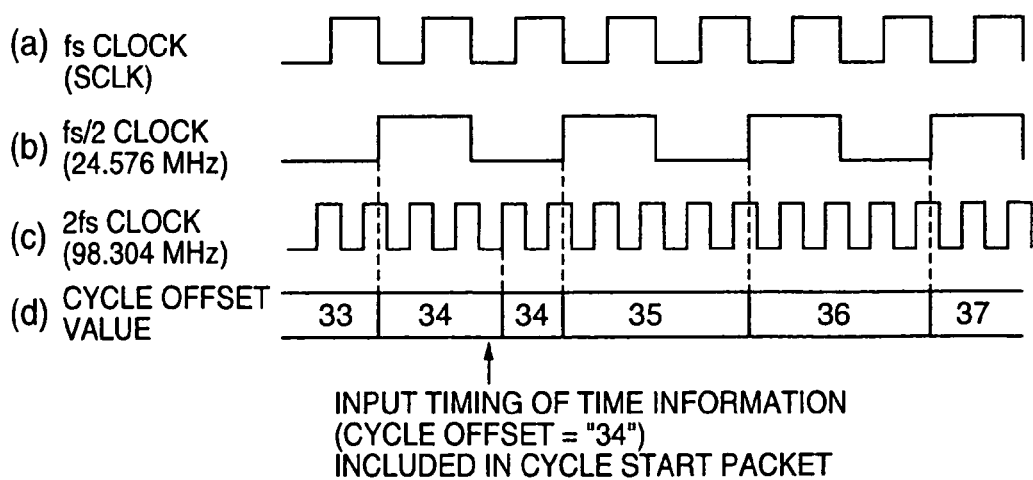
FIG. 7 is a timing chart showing an operation of cycle time register control in the IEEE1394 link-layer LSI according to the first embodiment.

Referring to FIG. 7, the cycle time register controller 150 increments the cycle offset value of the cycle time register at the rising edge of the ½ fs clock and overwrites the cycle offset value with the input time information at timing of the rising edge of the 2 fs clock. For example, when a cycle start packet having a cycle offset value of "34" as time information is received at the timing as indicated by an arrow, the overwriting of the cycle offset value with "34" is performed at the rising edge of the 2 fs clock immediately after the receipt of the cycle start packet. At the rising edge of the ½ fs clock immediately after that, the cycle offset value is incremented to "35".

In this manner, the cycle time register can be adjusted with a resolution of about 10 nanoseconds. This allows much more accurate time adjustment to the cycle master, compared to the conventional one-cycle offset adjustment (in steps of about 40 nanoseconds). Accordingly, the isochronous cycle period of about 125 μsec can be adjusted more precisely, resulting in reduced frequency fluctuations at each node.

1.3) Operation

Figure 8:
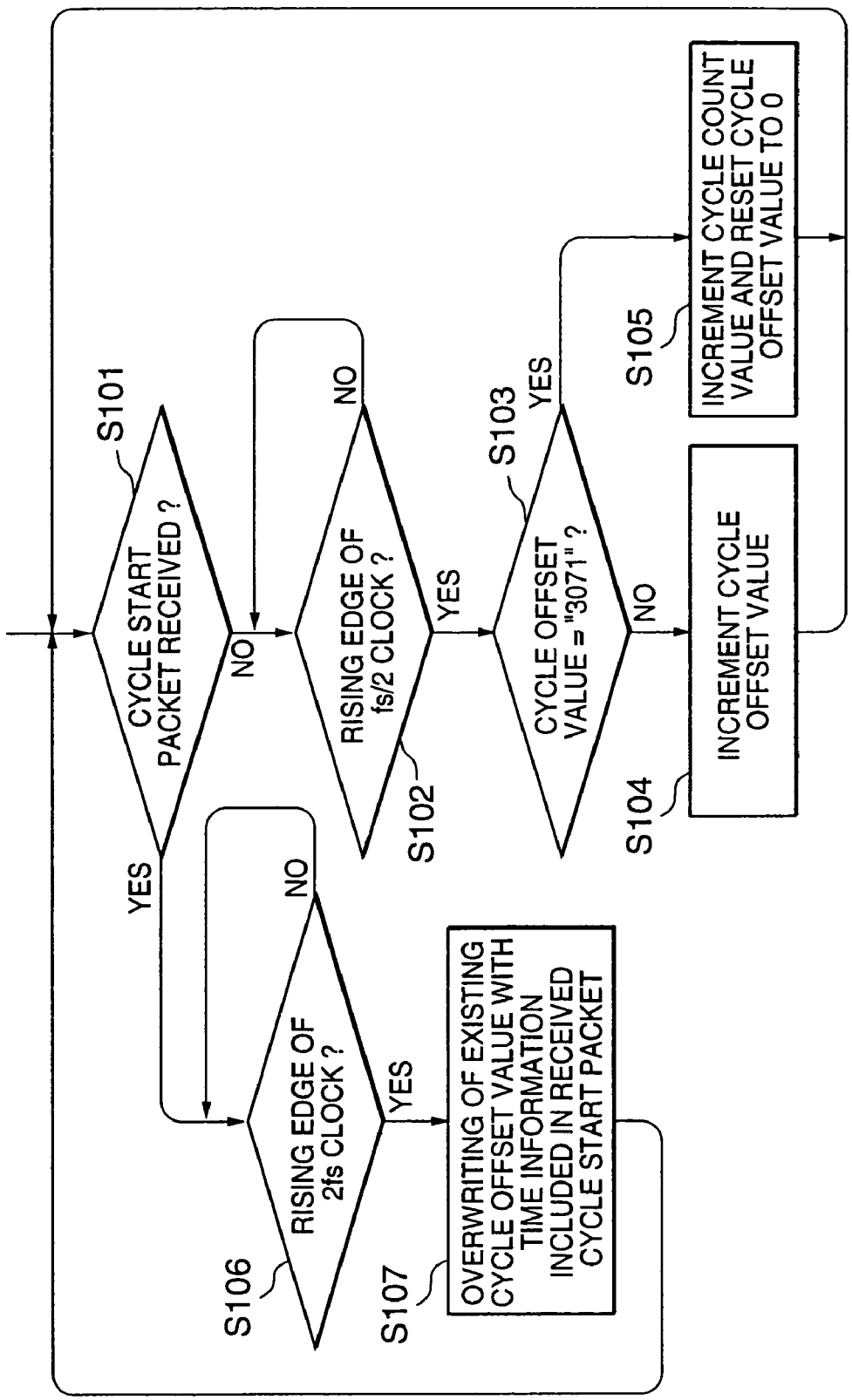
FIG. 8 is a flow chart showing a main operation of the IEEE1394 link-layer LSI according to the first embodiment.

Referring to FIG. 8, it is determined whether a cycle start packet is received (step S101). When no cycle start packet is received (NO in step S101), it is determined whether the present timing is coincident to the rising edge of the ½ fs clock (step S102). At the rising edge of the ½μ fs clock (YES in step S102), it is further determined whether the cycle offset value is equal to "3071" (step S103). When it is not equal to "3071" (NO in step S103), the cycle offset value is incremented by one (step S104) and the control goes back to the step S101. When it is equal to "3071" (YES in step S103), the cycle count value of the cycle time register is incremented by one and resets the cycle offset value to zero (step S105). Thereafter, the control goes back to the step S101.

When a cycle start packet is received (YES in step S101), it is determined whether the present timing is coincident to the rising edge of the 2 fs clock (step S106) At the rising edge of the 2 fs clock (YES in step S106), the existing cycle offset value is overwritten with the time information included in the received cycle start packet (stop S107). Thereafter, the control goes back to the step S101.

1.4) Modified Example

Figure 9:
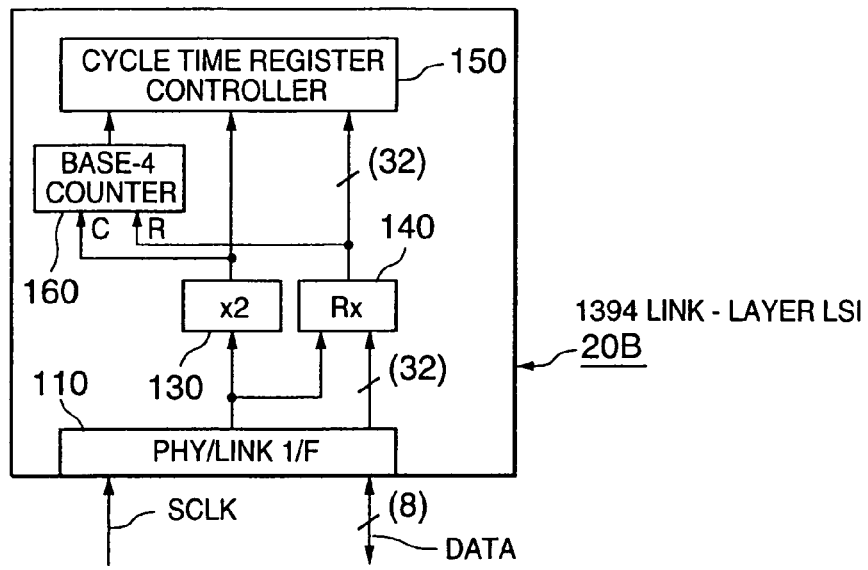
FIG. 9 is a block diagram showing another example of the IEEE1394 link-layer LSI according to the first embodiment of the present invention.

Referring to FIG. 9, a link-layer LSI 20B according to a modified example of the first embodiment is provided with a base-4 counter 160 instead of the frequency divider 120. The other circuit blocks are the same as those in the link-layer LSI 20A of FIG. 6. Accordingly, these blocks are denoted by the same reference numerals and the details will be omitted.

The base-4 counter 160 increments by one from 0 to 3 before resetting to zero and starting again and is forced to be reset to zero when the packet receiver 140 outputs time information included in a received cycle start packet. The base-4 counter 160, when reset to zero, outputs a pulse signal to the cycle time register controller 150.

Figure 10:
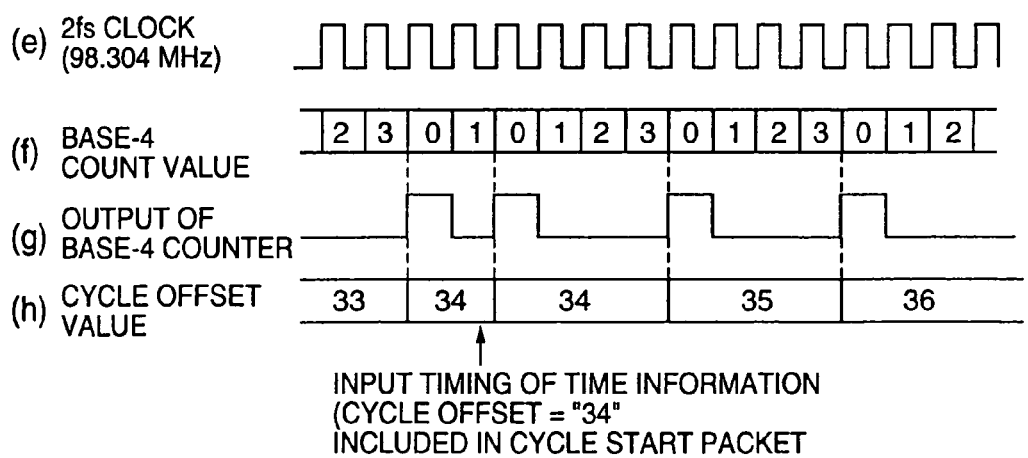
FIG. 10 is a timing chart showing an operation of cycle time register control in the IEEE1394 link-layer LSI of FIG. 9.

As shown in FIG. 10, the base-4 counter 160 increments by one from 0 to 3 according to the 2 fs clock received from the frequency multiplier 130 and outputs the pulse signal to the cycle time register controller 150 when it is reset to zero (see FIG. 10(g)). The cycle time register controller 150 increments the cycle offset value of the cycle time register when the pulse signal is received from the base-4 counter 160.

When a cycle start packet is received and its time information is output to the cycle time register controller 150, the base-4 counter 160 is forced to be reset to zero, which causes the pulse signal to be output to the cycle time register controller 150. When the pulse signal is received, the cycle time register controller 150 overwrites the cycle offset value with the time information received from the packet receiver 140.

For example, when a cycle start packet having a cycle offset value of "34" as time information is received at the timing as indicated by an arrow, the base-4 counter 160 is forced to be reset to zero, which causes the pulse signal to be output to the cycle time register controller 150. Accordingly, the overwriting of the cycle offset value with "34" is performed at the rising edge of the 2 fs clock immediately after the receipt of the cycle start packet. At the rising edge of a pulse signal immediately after that, the cycle offset value is increased to "35".

In this manner, concurrently with the overwriting of the cycle offset value with the received time information, the base-4 counter 160 is forced to be reset to zero. Therefore, the overwritten cycle offset value is surely held for a lapse of one cycle offset period after the overwriting.

This modified example employing the base-4 counter 160 uses only one clock (2fs clock), resulting in further stable operation at each node. In addition, as described before, frequency fluctuations can be effectively reduced. The cycle time register can be adjusted with a resolution of about 10 nanoseconds. This allows much more accurate time adjustment to the cycle master, compared to the conventional one-cycle offset adjustment (in steps of about 40 nanoseconds). Accordingly, the isoebronous cycle period of about 125 μsec can be adjusted more precisely, resulting in reduced frequency fluctuations at each node.

Further, in place of the frequency multiplier 130 of 2-fold increase in frequency, an n-fold frequency multiplier (n=4, 8, or other number) may be used to obtain a higher resolution.

Second Embodiment 2.1) Digital Video Player

Figure 11:
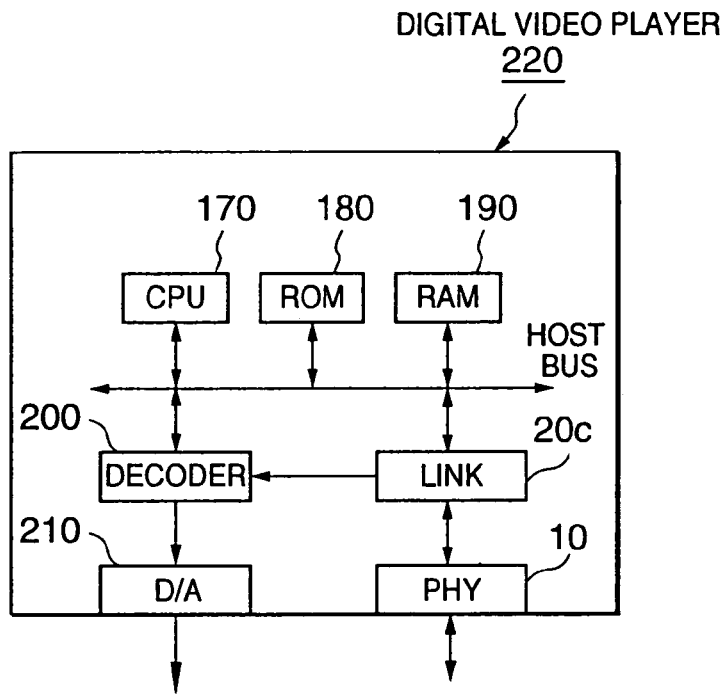
FIG. 11 is a block diagram showing an internal circuit of a digital video player employing an IEEE1394 link-layer LSI according to a second embodiment of the present invention.

Referring to FIG. 11, a digital video player 220 employs a link-layer LSI 20C according to a second embodiment of the present invention. The digital video player 220 further includes a PHY LSI 10, a processor (CPU) 170, a ROM 180, RAM 190, a decoder 200, and a digital-to-analog converter 210. The digital video player 220 decodes a digital video signal of DV format received from the IEEE1394 bus and outputs an analog video signal.

The digital video signal of DV format is mapped into isochronous stream packet following IEC 61883 standard. More specifically, the upper eight bytes of the data field of an isochronous stream packets are defined as a header of a common isochronous packet (CIP) in the IEC 61883 standard, The type of video format and time stamp information are stored in the CIP header.

The link-layer LSI 20C has a host interface to a host bus connected to other components including the processor (CFU) 170 and a stream interface to the decoder 200 for input and output of isochronous stream packets which are needed to be processed at high speeds. The processor 170 performs software processing of IEEE1394 protocols of transaction layer and the like. The decoder 200 also has a host interface and a stream interface similar to those of the link-layer LSI 20C.

2.1) Link-Layer LSI

Figure 12:
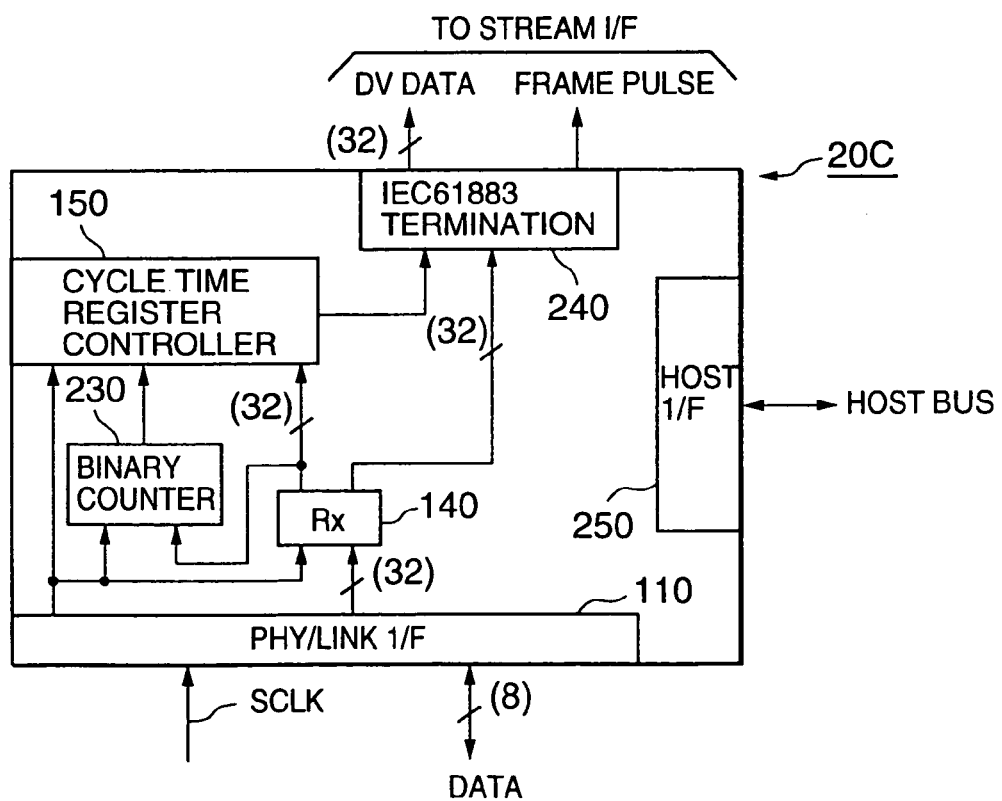
FIG. 12 is a block diagram showing an internal circuit of the IEEE1394 link-layer LSI according to the second embodiment.

Referring to FIG. 12, the link-layer LSI 20C is provided with a physical-layer/link-layer (PHY/LINK) interface 110 through which plural signals (e.g. in the neighborhood of nine kinds of signals) are inputted and outputted from and to the PHY LSI 10. In FIG. 12, however, only a system clock signal SCLK and data are depicted. The system clock signal SCLK is received from the PHY LSI 10. As for data, the PHY/LINK interface 110 is a bidirectional interface to the PHY LSI 10 to exchange packets.

The 1394 link-layer LSI 20C operates according to the system clock signal SCLK, which has a frequency fs of 49.152 MHz, that is, two times the clock frequency of the crystal oscillator provided in the PHY LSI 10. A packet inputted from the IEEE1394 bus enters a packet receiver 140 through the PHY/LINK interface 110. When the packet receiver 140 determines that the input packet is an isochronous stream packet, the packet of data is output to an IEC61883 termination 240. In addition, when receiving a cycle start packet, the packet receiver 140 outputs time information included in the cycle start packet to a cycle time register controller 150.

The IEC61883 termination 240 reconstructs DV data based on information stored in the CIP header and produces a nominal video frame pulse of approximate 30 Hz from the time stamp stored in the CIP header and time information inputted from the cycle time register of its own and outputs them to the stream interface.

The 1394 link-layer LSI 20C performs cycle time register control using a binary counter 230 that operates according to the system clock signal SCLK. The binary counter 230 alternately indicates '0' and '1' and is forced to be reset to zero when a cycle start packet is received. The binary counter 230 outputs a pulse signal when the binary counter 230 indicates zero. The cycle time register controller 150 performs the cycle time register control using the output of the binary counter 230, the system clock signal SCLK, and a received cycle start packet, which will be described with reference to FIG. 13.

2.3) Cycle Time Register Control

Figure 13:
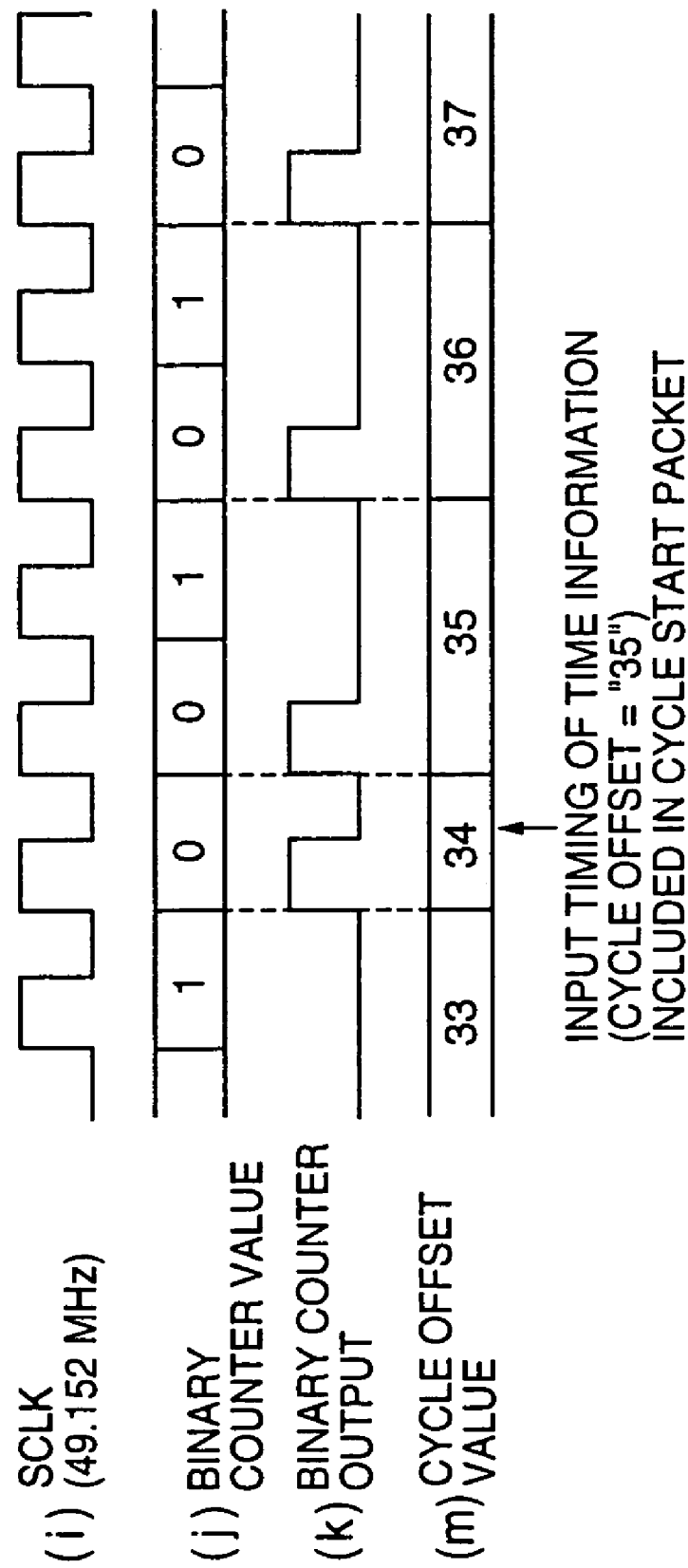
FIG. 13 is a timing chart showing an operation of cycle time register control in the IEEE1394 link-layer LSI according to the second embodiment.

Referring to FIG. 13, the binary counter 230 outputs the pulse signal to the cycle time register controller 150 when it is reset to zero (see FIG. 13(*k*)). The cycle time register controller 150 increments the cycle offset value of the cycle time register when the pulse signal is received from the binary counter 230.

When a cycle start packet is received and its time information is output to the cycle time register controller 150, the binary counter 230 is forced to be reset to zero, which causes the pulse signal to be output to the cycle time register controller 150. When the pulse signal is received, the cycle time register controller 150 overwrites the cycle offset value with the time information received from the packet receiver 140.

For example, when a cycle start packet having a cycle offset value of "35" as time information is received at the timing as indicated by an arrow, the binary counter 230 is forced to be reset to zero, which causes the pulse signal to be output to the cycle time register controller 150. Accordingly, the overwriting of the cycle offset value with "35" is performed at the rising edge of the system clock signal SCLK immediately after the receipt of the cycle start packet. At the rising edge of a pulse signal immediately after that, the cycle offset value is increased to "36".

In this manner, concurrently with the overwriting of the cycle offset value with the received time information, the binary counter 230 is forced to be reset to zero. Therefore, the overwritten cycle offset value is held for a lapse of one cycle offset period after the overwriting.

Figure 14:
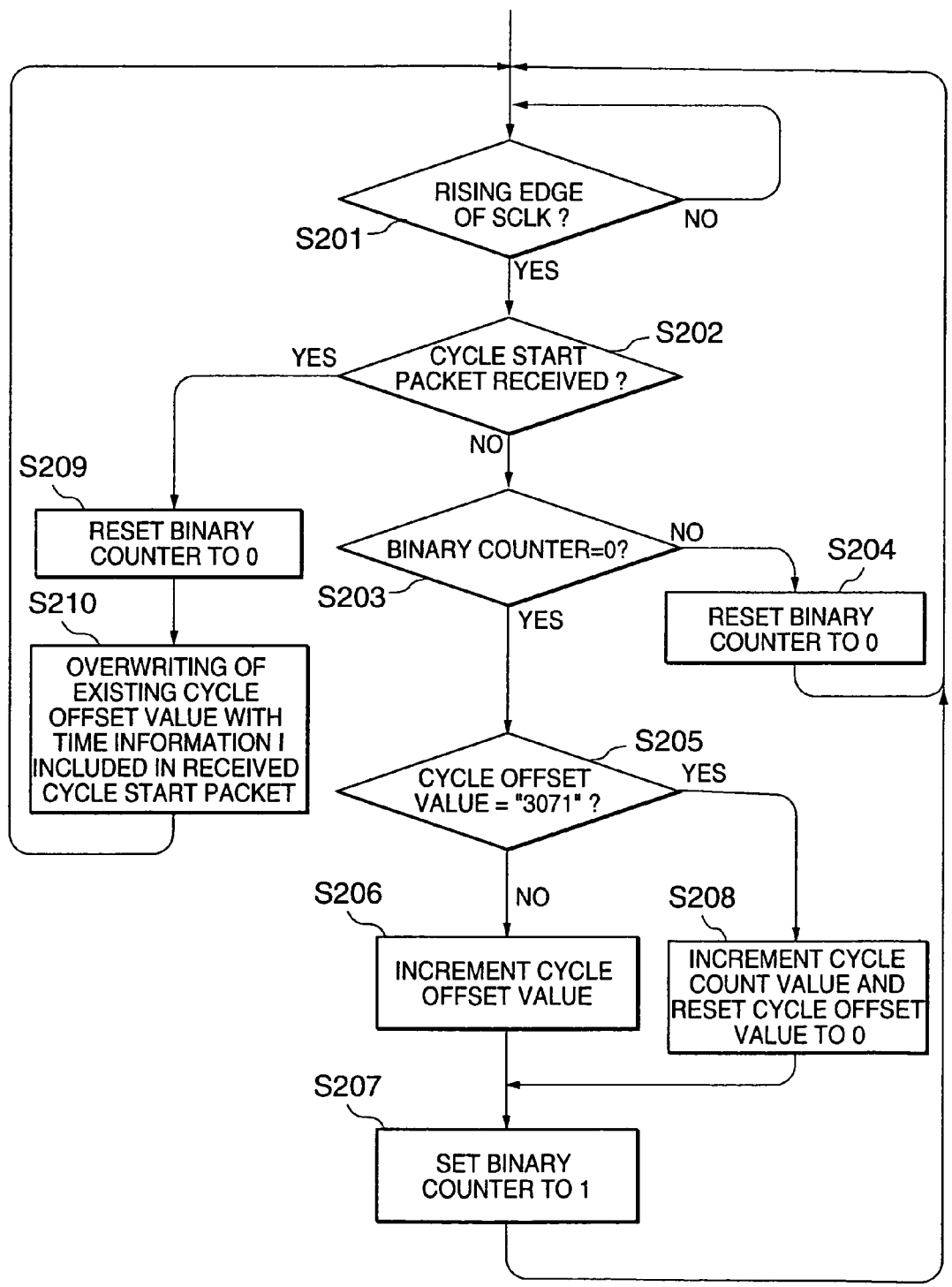
FIG. 14 is a Slow chart showing a main operation of the IEEE1394 link-layer LSI according to the second embodiment.

Referring to FIG. 14, it is determined whether the system clock signal SCLK goes high (step S201) and, at the rising edge of the system clock signal SCLK (YES in step S201), it is further determined whether a cycle start packet has been received (step S3202). When no cycle start packet is received (NO in step S202), it is determined whether the binary counter 230 is equal to 0 (step S203).

When the binary counter 230 is riot equal to 0, that is, 1 (NO in step S203), the binary counter 230 is reset to 0 (step S204) and the control goes back to the step S201. When the binary counter 230 is equal to 0 (YES in step S203), it is further determined whether the cycle offset value is 4 equal to "3071" (step S205).

When it is not equal to "3071" (No in step S205), the cycle offset value is incremented by one (step S206). When it is equal to "3071" (YES in step S205), the cycle count value of the cycle time register is incremented by one and resets the cycle offset value to zero (step S208). After the step S206 or S208, the binary counter 230 is set to 1 (step S207) and the control goes back to the step S201.

When a cycle start packet is received (YES in step S202), the binary counter 230 is reset to 0 (step S209) and the existing cycle offset value is overwritten with the time information included in the received cycle start packet (step S210). Thereafter, the control goes back to the step S201.

In this manner, much more accurate time adjustment to the cycle master can be achieved, compared to the conventional one-cycle offset adjustment. Accordingly, the isochronous cycle period of about 125 μsec can be adjusted more precisely, resulting in reduced frequency fluctuations, which achieves reduced jitter of the frame pulse signal. Therefore, the digital video player 220 can decode a high-quality video signal.

The second embodiment as shown in FIG. 12 employs no frequency multiplier, resulting in a more simplified circuit structure.

In this embodiment, the cycle time register control is performed by the cycle time register controller 150 provided in the link-layer LSI 20C. Alternatively, it is possible to perform the same control by running a cycle time register control program on the processor 170. The cycle time register control program may be previously stored in the ROM 180.

Third Embodiment 3.1) Bridge Network

Figure 15:
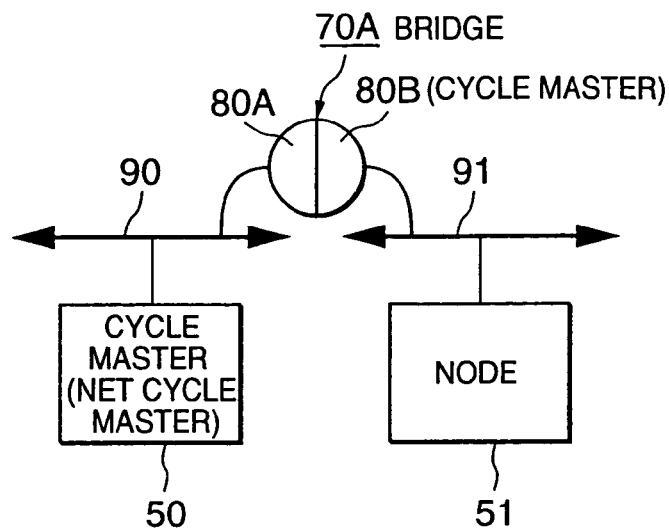
FIG. 15 is a block diagram showing an IEEE1394 bridge network employing a bridge according to a third embodiment of the present invention.

Referring to FIG. 15, it is assumed that a bridge 70A connects two IEEE1394 buses 90 and 91 and the bridge 70A is composed of portals 80A and 80B, which are connected to the buses 90 and 91, respectively. The respective buses 90 and 91 are connected to nodes 50 and 51.

In this embodiment, the node 50 functions as a cycle master of the bus 90 and a net cycle master for the entire bridge network. On the other hand, the portal 80 of the bridge 70A functions as a cycle master of the bus 91. Therefore, the bridge 70A performs synchronization of the portal 80B to the portal 80A. The portal 80A is a master portal and the portal 80B is a slave portal. The slave portal 80B as the cycle master of the bus 91 notifies the bus 91 by a cycle start packet of time information obtained by the cycle time register control, so that synchronization is established in the entire bridge network.

3.2) Bridge

Figure 16:
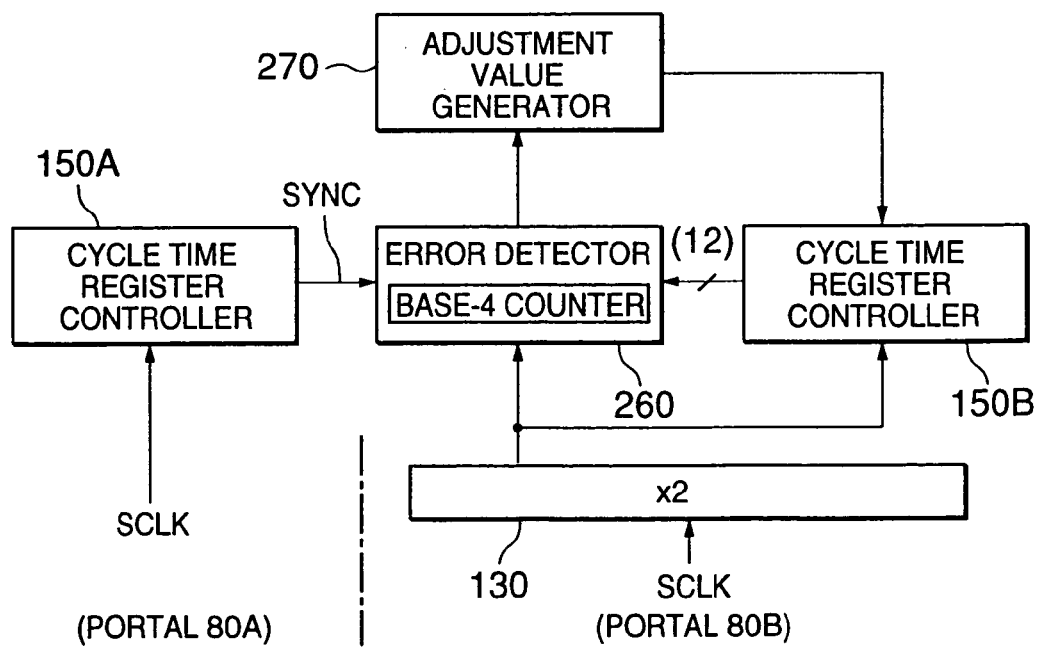
FIG. 16 is a block diagram showing an inter-bus synchronization control circuit of the bridge according to the third embodiment.

Referring to FIG. 16, the bridge 70A includes an inter-bus synchronization control circuit composed of the master portal 80A and the slave portal 80B. The master portal 80A includes a cycle time register controller 150A. The slave portal 80b includes a frequency multiplier 130, a cycle time register controller 150B, an error detector 260, and an adjustment value generator 270.

In the master portal 80A, the cycle time register controller 150A synchronizes to the net cycle master 50 according to an appropriate synchronization control as described before. Every time a cycle offset value (cycle_offset) of the cycle time register incorporated in the master portal 80A is coincident to a predetermined value, the cycle time register controller 150A outputs a sync pulse to the error detector 260 of the slave portal 80B. For example, the predetermined value maybe set to 3070. In this case, every time cycle_offset 3070, the sync pulse is generated.

In the slave portal 80B, the error detector 260 operates according to a 2 fs clock signal of 98.304 MHz, which is generated by the frequency multiplier 130. The frequency multiplier 130 multiplies the frequency fs of the system clock signal SCLK by two to produce the 2 fs clock of 98.304 MHz, which is supplied to the error detector 260 and a cycle time register controller 1503.

3.2.1) Error Detector

The error detector 260 has a base-4 counter incorporated therein. By using the base-4 counter, the error detector 260 can detect an error from the net cycle master with a resolution of about 10 nanoseconds, which is one-fourth of one cycle offset of about 40 nanoseconds.

When having received the sync pulse from the cycle time register controller 150A, the error detector 260 inputs a cycle offset value of the cycle time register incorporated in the cycle time register controller 150B. Then, the predetermined value (here, 3070) is subtracted from the cycle offset value of the slave portal 80B to produce a cycle offset error of the slave portal 80b with respect to the master portal 80A. A detected error cycle is obtained by adding the cycle offset error to one-fourth of a value of the base-4 counter at that time point. An example of time adjustment will be described with reference to FIGS. 17A and 17B.

3.2.2) Time Adjustment

Figures 17A, 17B:
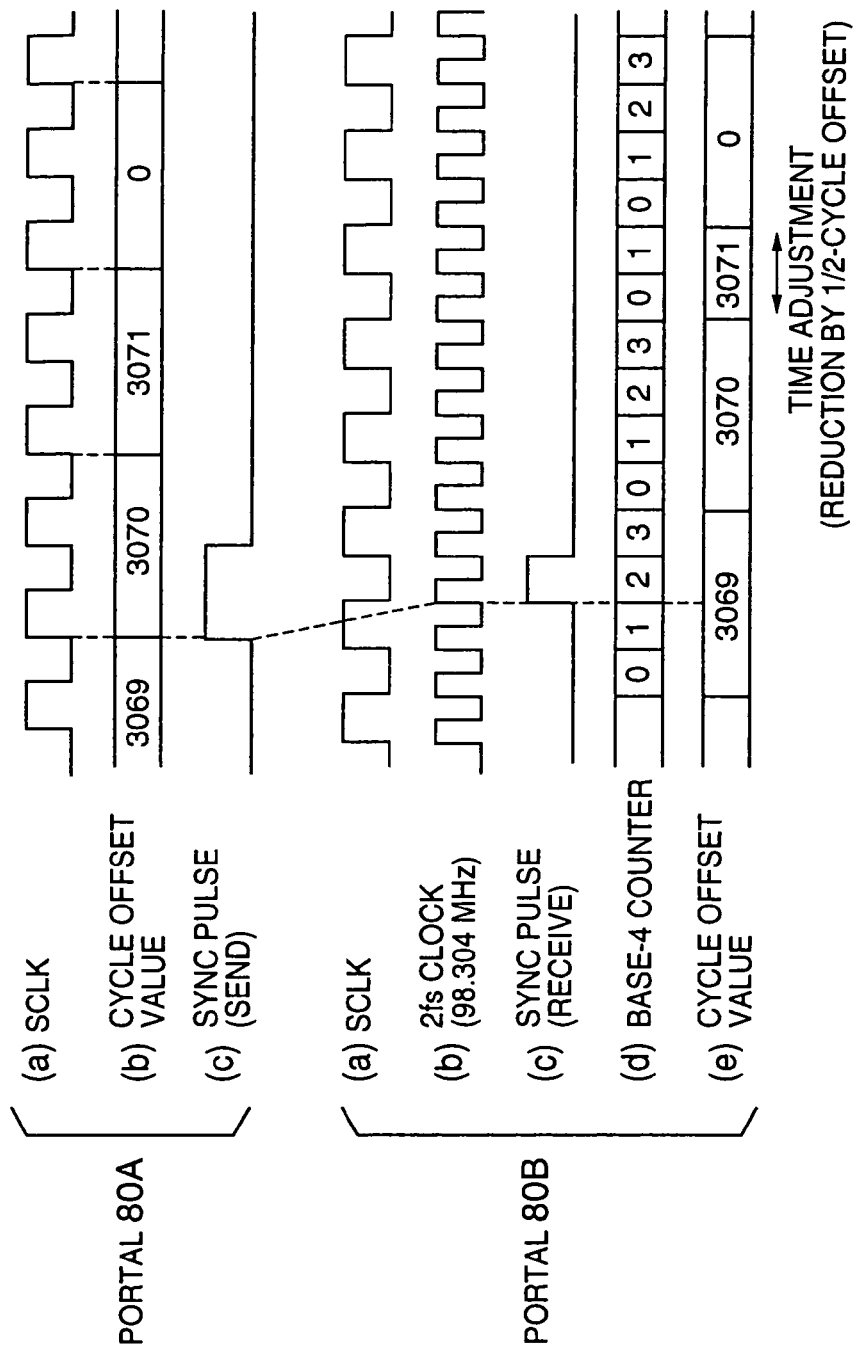
FIG. 17A is a timing chart showing an operation of inter-bus synchronization control in one portal of the bridge as shown in FIG. 16.
FIG. 17B is a timing chart showing an operation of inter-bus synchronization control in the other portal of the bridge as shown in FIG. 16.

Referring to FIG. 17A, as described before, when a cycle offset value (cycle_offset) of the cycle time register incorporated in the master portal 80A is coincident to "3070", the cycle time register controller 150 outputs a sync pulse to the error detector 260 of the slave portal 80B.

Referring to FIG. 17B, it is assumed that the sync pulse is received from the cycle time register controller 150A when the base-4 counter of the error detector 260 indicates "2" and its own cycle offset value of the cycle time register is "3069". In this case, a cycle offset error is −1, which is obtained by subtracting 3070 from 3069. Since the base-4 counter indicates "2", a detected error cycle is −½, which is obtained by adding ²⁄₄ to −1. This means that the cycle offset of the slave portal 80B lags that of the master portal 80A by ½ cycle.

The adjustment value generator 270 generates a cycle period time adjustment value in the slave portal 80B based on the detected error cycle inputted from the error detector 260, which will be described in detail later. The cycle time register controller 150B inputs the cycle period time adjustment value from the adjustment value generator 270 and increases or decreases a cycle period of 125 μsec by the cycle period time adjustment value. This cycle period time adjustment value is also determined with a resolution of one-fourth of one cycle offset. Since the portal 80B is a cycle master for the bus 91, the portal 80B transmits a cycle start packet depending on the adjusted timing, so that the buses 90 and 91 are synchronized, 3.2.3) Adjustment Value In the adjustment value generator 70, a relationship between input cycle errors and output adjustment values is determined as described hereinafter.

The maximum absolute value of an adjustment value is determined based on the poorest clock frequency accuracy in the bridge network as described below. Since the IEEE1394 standard defines that the clock frequency accuracy is ±100 ppm, the worst imaginable case is a frequency deviation of 200 ppm. When an isochronous cycle that is a cycle offset of 3072 is increased or decreased by an amount of ¼-cycle offset as an adjustment value, a frequency deviation is approximately 81.4 ppm (=0.25/3072). Accordingly, when a frequency deviation of 200 ppm occurs as the worst case, the adjustment value of ¼-cycle offset cannot control such a frequency deviation. To effectively control a frequency deviation of 200 ppm, an adjustment value of at least ¾-cycle offset is needed in the case of a ¼-cycle offset resolution. This adjustment value can control up to a frequency deviation of approximately 244.1 ppm (=0.75/3072). Accordingly, the ¾-cycle offset is used as the maximum adjustment value and the relationship between errors and adjustment values is shown, as an example, in TABLE I.

TABLE I

| Absolute value of error | Adjustment value |
| --- | --- |
| ¾-cycle offset or more | ¾-cycle offset |
| ½-cycle offset | ½-cycle offset |
| ¼-cycle offset | ¼-cycle offset |
| 0-cycle offset | 0-cycle offset |

Another relationship may be possible. For example, when the absolute value of error is equal to or lower than ½-cycle offset, the adjustment value may be set to 0 Ad regardless of absolute values of error. Alternatively, the adjustment value may be set based on a history of adjustment values or so-called integral control.

Further, in the case of an extremely large error when the cycle time register is in pull-in status just after the bridge is powered on, an adjustment value much larger than the clock frequency accuracy may be used to rapidly establish synchronization. For example, when the absolute value of error is greater than 100-cycle offset, the adjustment value is set to 32-cycle offset.

In this manner, much more accurate time adjustment of the slave portal 80B to the master portal 80A can be achieved with a resolution of approximately 10 nanoseconds, compared to the conventional one-cycle offset (approximately 40 nanoseconds). Accordingly, frequency fluctuations or deviations of the cycle time register can be reduced in the IEEE1394 bus 91 having the portal 80B as a cycle master.

In FIG. 15, another node may be a cycle master of the bus 91. For example, instead of the portal 80B, a node 51 may be the cycle master. In this case, the functions defined in P1394.1 standard as described before is needed in the portal 80B and the node 51. However, the adjustment value of P1394.1 standard is fixed to ±1-cycle offset. Accordingly, the synchronization code (sy) field is necessarily defined so as to allow a higher resolution of adjustment.

Fourth Embodiment

4.1) Bridge Network

A bridge network employing a bridge according to a fourth embodiment of the present invention is similar to that of the third embodiment as shown in FIG. 15. In the fourth embodiment, it is also assumed that a bridge 70A connects two IEEE1394 buses 90 and 91 and the bridge 70A is composed of portals 80A and 80B, which are connected to the buses 90 and 91, respectively. The respective buses 90 and 91 are connected to nodes 50 and 51.

In this embodiment, the node 50 functions as a cycle master of the bus 90 and a net cycle master for the entire bridge network. On the other hand, the portal 80B of the bridge 70A functions as a cycle master of the bus 91. Therefore, the bridge 70A performs synchronization of the portal 80B to the portal 80A. The portal 80A is a master portal and the portal 80B is a slave portal. The slave portal 80B as the cycle master of the bus 91 notifies the bus 91 by a cycle start packet of time information obtained by the cycle time register control, so that synchronization is established in the entire bridge network.

4.2) Bridge

Referring to FIG. 18, the bridge 70A includes an inter-bus synchronization control circuit composed of the master portal 80A and the slave portal 80B. The master portal 80A includes a cycle time register controller 150A and a binary counter 230. The slave portal 80b includes a cycle time register controller 150B, an error detector 260, and an adjustment value generator 270.

In the master portal 80A, the cycle time register controller 150A synchronizes to the net cycle master 50 by receiving a cycle start packet from the net cycle master with a resolution of the system clock system SCLK, which is employed in the second embodiment (see FIGS. 12 and 13). More specifically, the binary counter 230 operates according to the system clock signal SCLK and outputs a pulse to the cycle time register controller 150A every time its count is equal to 0. Further, the binary counter 230 is reset to zero when the cycle start packet has been received. The cycle offset value of the cycle time register incorporated in the cycle time register controller 150A is incremented by one according to the output of the binary counter 230. Every time the cycle offset value (cycle_offset) of the cycle time register is coincident to a predetermined value (here, 3070), the cycle time register controller 150A outputs a sync pulse to the error detector 260 of the slave portal 80B. In this manner, the synchronization control of the cycle time register is performed with a resolution of the system clock signal SCLK, resulting in reduced frequency deviations of the cycle time register.

In the slave portal 80B, the system clock signal SCLK is supplied to the error detector 260 and a cycle time register controller 150. The error detector 260 operates according to the system clock signal SCLK. When having received the sync pulse from the cycle time register controller 150A, the error detector 260 inputs a cycle offset value of the cycle time register incorporated in the cycle time register controller 150B. Then, the predetermined value (here, 3070) is subtracted from the cycle offset value of the slave portal 80B to produce a cycle offset error of the slave portal 80B with respect to the master portal 80A. An example of time adjustment will be described with reference to FIGS. 19A and 19B.

4.3) Time Adjustment

Referring to FIG. 19A, as described before, when a cycle offset value (cycle_offset) of the cycle time register incorporated in the master portal 80A is coincident to "3070", the cycle time register controller 150A outputs a sync pulse to the error detector 260 of the slave portal 80B.

Referring to FIG. 19B, it is assumed that the sync pulse is received from the cycle time register controller 150A when its own cycle offset value of the cycle time register is "3071". In this case, a cycle offset error is +1, which is obtained by subtracting 3070 from 3071. This means that the cycle offset of the slave portal 80B leads that of the master portal 80A by one cycle.

The adjustment value generator 270 generates a cycle period time adjustment value in the slave portal 80B based on the detected error cycle and a predetermined correspondence table. Here, the one-cycle offset is used as the maximum adjustment value and the relationship between errors and adjustment values is shown, as an example, in TABLE II.

TABLE II

| Absolute value of error | Adjustment value |
| --- | --- |
| 2-cycle offset or more | 1-cycle offset |
| 1-cycle offset | ½-cycle offset |
| 0-cycle offset | 0-cycle offset |

Accordingly, when the cycle offset error is +1, the adjustment value generator 270 generates a cycle period time adjustment value of +½-cycle offset. The cycle time register controller 150B inputs the cycle period time adjustment value of +½-cycle offset and increases a cycle period of 125 μsec by ½-cycle offset as shown in FIG. 19B. Since the portal 80B is a cycle master for the bus 91, the portal 80B transmits a cycle start packet depending on the adjusted timing, so that the buses 90 and 91 are synchronized.

4.4) Operation of Slave Portal

Figure 20:
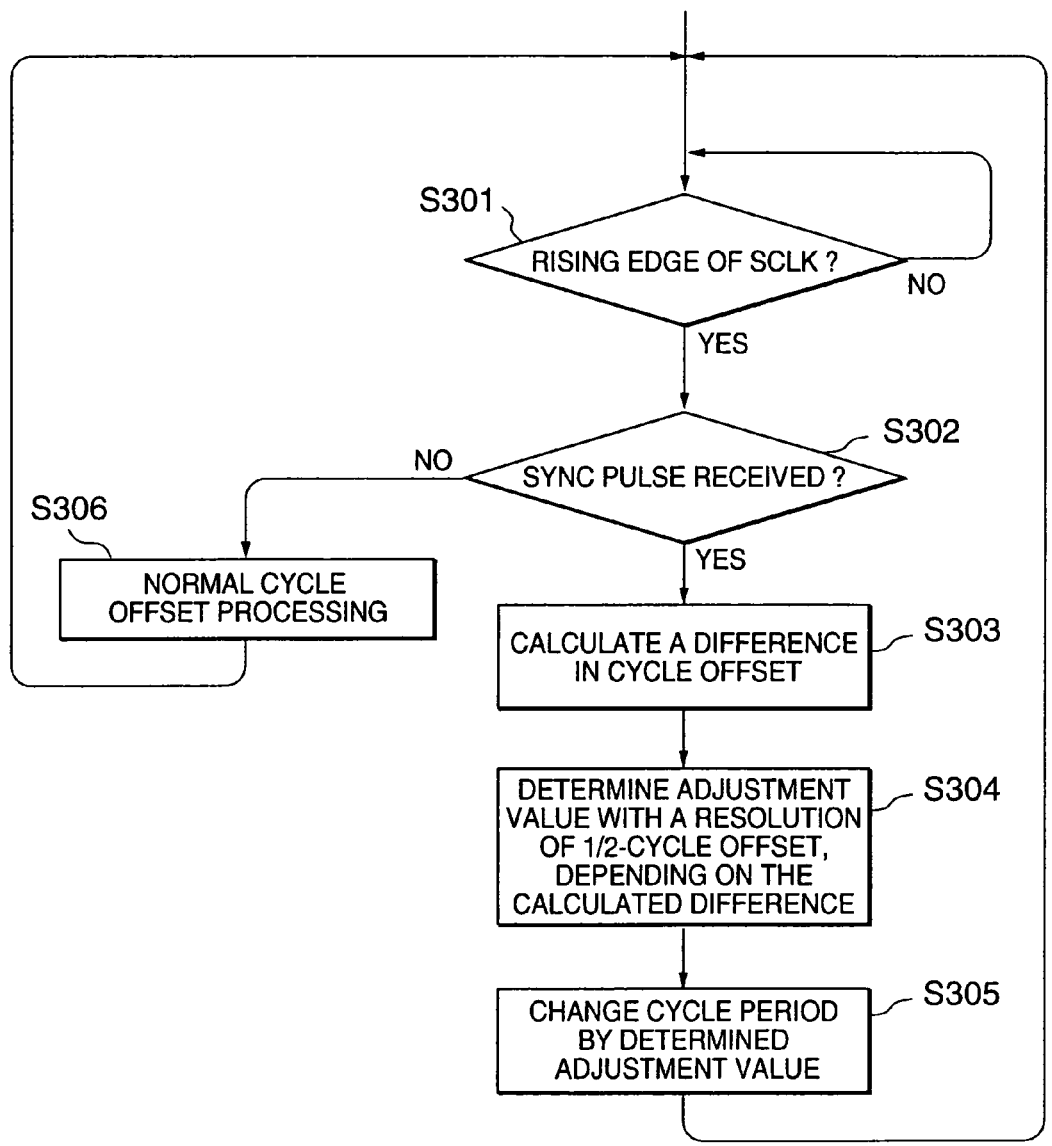
FIG. 20 is a flow chart showing a schematic example of an operation of the other portal of the bridge as shown in FIG. 18.

Referring to FIG. 20, it is determined whether the system clock signal SCLK goes high (step S301) and, at the rising edge of the system clock signal SCLK (YES in step S301), it is further determined whether a sync pulse has been received (step S302). When no sync pulse is received (NO in step S302), normal cycle offset processing is performed (step S306) and the control goes back to the step S301.

When a sync pulse has been received (YES in step S302), the error detector 260 subtracts the predetermined value (here, 3070) from the cycle offset value of the slave portal 80B to produce a difference in cycle offset of the slave portal 80B with respect to the master portal 80A (step S303) The adjustment value generator 270 generates a cycle period time adjustment value in the slave portal 803 based on the calculated difference and the correspondence table (TABLE II) and the cycle time register controller 150B changes the cycle period by the cycle period time adjustment value (step S305).

In this manner, much more accurate time adjustment of the slave portal 80B to the master portal 80A can be achieved. Accordingly, frequency fluctuations or deviations of the cycle time register can be reduced in the IEEE1394 bus 91 having the portal 8OB as a cycle master.

Fifth Embodiment

Figure 21:
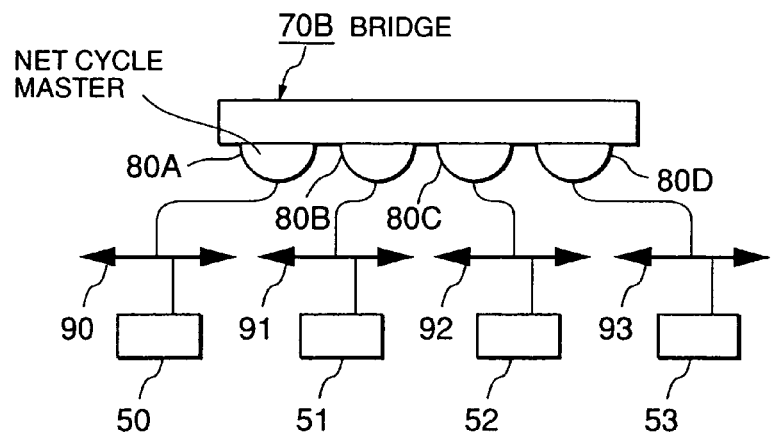
FIG. 21 is a block diagram showing an IEEE1394 bridge network employing a bridge according to a fifth embodiment of the present invention.

Referring to FIG. 21, abridge 70B according to a fifth embodiment of the present invention has three or more portals, each of which is connected to a corresponding IEEE1394 bus. In this example, the bridge 70B is provided with four portals 80A–80D each having buses 90–93 connected thereto, and it is assumed that each portal is a cycle master for a corresponding bus and the portal 80A functions as the net cycle master.

Figure 22:
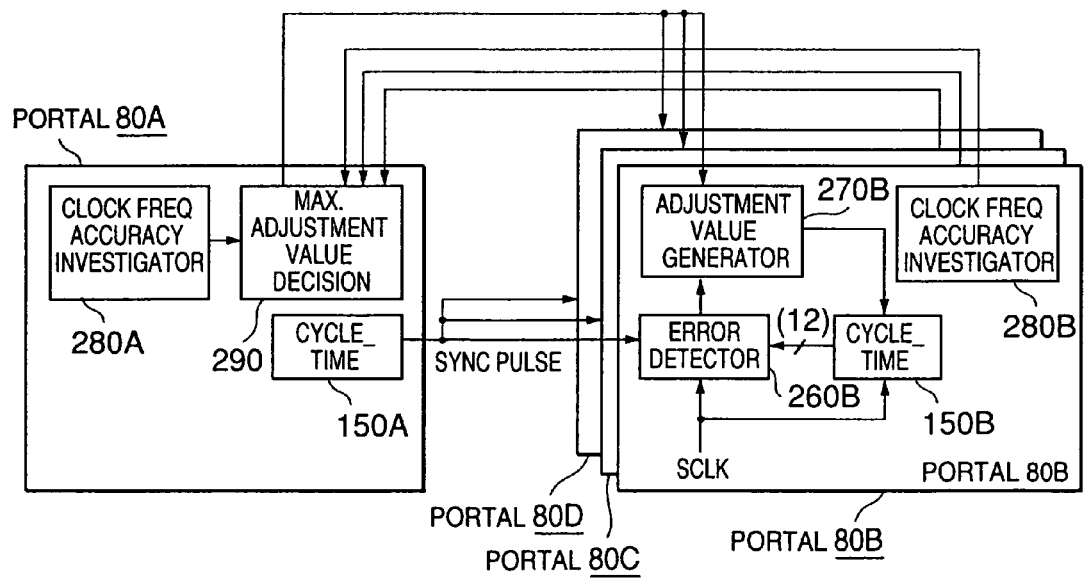
FIG. 22 is a block diagram showing the bridge according to the fifth embodiment of the present invention.

Referring to FIG. 22, the bridge 70B is functionally divided into the master portal 80A and other slave portals 80B–80D. Every time a cycle offset value (cycle_offset) of the cycle time register incorporated in the master portal 80A is coincident to "3070", the cycle time register controller 150A outputs a sync pulse to the slave portals 80B–80D. The slave portals 80B–80D individually perform synchronization control based on the sync pulse received from the master portal 80A. The synchronization control in each slave portal is basically the same as that in the fourth embodiment (see FIG. 18) but it is different from the fourth embodiment in a function of dynamically determining the maximum adjustment value. Details of this function will be described below.

IEEE1394 standard, as described before, defines that the permissible deviation of a clock frequency is ±100 ppm. However, if the clock frequency of each network device is actually more precise, then the adjustment value for synchronization control is expected to be smaller, resulting in improved synchronization performance. Accordingly, the maximum adjustment value can be dynamically determined depending on the clock frequency accuracy of devices actually connected to the network. The bridge 70B according to the present embodiment implements such a function of dynamically determining the maximum adjustment value.

As shown in FIG. 22, the master portal 80A is provided with a clock frequency accuracy investigator 280A and a maximum adjustment value decision section 290. The respective slave portals 80B–80D are provided with clock frequency accuracy investigators 280B–280D. Each of the clock frequency accuracy investigators 280A–280D investigates the clock frequency accuracy of a node connected to a corresponding bus. More specifically, the clock frequency accuracy information has been written in the cyc_clk_acc field of a configuration ROM area where node performance information has been stored. It is enough to read the clock frequency accuracy information from a portal and a cycle master within a corresponding bus. When there is a possibility that its cycle master changes depending on insertion or removal of a node, it is necessary to update the investigation result as occasion demands.

The cyc_clk_acc values of all nodes may be investigated regardless of node type such as portal or cycle master. However, the cyc_clk_acc field implementation is not necessary. Therefore, even if a read request is sent to all nodes, a node having no cyc_clk_acc field implemented cannot respond to the read request. In reality, almost all nodes having the cycle master function are expected to have the cyc_clk_acc field implemented. Accordingly, this cyc_clk_acc value reading procedure can be effectively used.

After clock frequency accuracy information have been read from nodes connected to a bus, the clock frequency accuracy investigator of a corresponding slave portal detects the lowest one of the read clock frequency accuracies and outputs it to the maximum adjustment value decision section 290 of the master portal 80A. The maximum adjustment value decision section 290 detects the network-wide lowest one of the lowest clock frequency accuracies received from the slave portals 80B–80D and determines the maximum adjustment value based on the network-wide lowest clock frequency accuracy.

Specifically, the maximum adjustment value is calculated as k·p according to the following inequality:

$$k\cdot p/3072 >= 2\cdot acc\_max,$$

where p is a time resolution of synchronization control (cycle offset) and acc_max is the lowest clock frequency accuracy.

For example, in the case where synchronization control is performed with a time resolution of ¼ cycle offset (p=¼), when the clock frequency accuracy is 100 ppm or less, a k=3 and therefore the maximum adjustment value is k·p=3/4 (cycle offset). In the case of an environment that the clock frequency accuracy is 20 ppm or less, the maximum adjustment value can be suppressed to ¼ cycle offset.

After the maximum adjustment value has been determined like this, the maximum adjustment value decision section 290 outputs it to the adjustment value generators 270B–270D of the slave portals 80b–80D. Using the maximum adjustment value, each of the slave portals 80b–80D performs the synchronization control as described before.

In the above example, each portal investigates the clock frequency accuracy of a node connected to the corresponding bus. Alternatively, one or more predetermined node may investigate the clock frequency accuracy of a node connected to another bus that is not connected to the predetermined node.

Further, in the above example, the investigation result of clock frequency accuracy for each bus is reported to the master portal 80A and the maximum adjustment value obtained from the investigation result is notified to all slave portals 80B–80D. This dynamically adjustment value determination operation is completely performed within the bridge 70B. However, it can be performed over a plurality of bridges by an additional protocol such as a new message format to exchange information between IEEE1394 buses.

The present invention is not restricted to the case of IEEE1394 standard. As long as time information is notified at regular intervals to synchronize a plurality of network devices, the present invention can be applied to such a system.

As described above, according to the present invention, frequency fluctuations caused by time information synchronization in a network can be reduced, resulting in improved quality of transmission of real-time data such as audiovisual stream through the network.

What is claimed is:

1. A bridge connecting a plurality of networks, each of which individually has time information varying in a predetermined time period of T, said bridge comprising:
   a first portal connected to a first network having first time information;
   a second portal connected to a second network having second time information;
   a time difference detector for detecting a time difference of the second time information with respect to the first time information;
   an adjustment value generator for determining a time adjustment value based on the time difference by referring to a table that includes a predetermined correspondence between time differences and time adjustment values, said time adjustment values having a predetermined step of adjustment, an absolute value of each of said time adjustment values being restricted within a predetermined range, said time adjustment value being an integral multiple of T/M (M is an integer greater than 1); and a controller for adjusting the second time information of the second network by the time adjustment value.

2. The bridge according to claim 1, wherein a maximum absolute value of the time adjustment values is a minimum value of integral multiples of the predetermined step of adjustment sufficient for adjusting a largest one of frequency deviations in local clocks of the network.

3. The bridge according to claim 1, wherein, when an absolute value of the time difference exceeds a predetermined threshold, the time adjustment value is set to a predetermined value beyond the predetermined range.

4. The bridge according to claim 1, wherein M is equal to 2.

5. A method for synchronizing a bridge network composed of at least one bridge having a plurality of portals each connected to different networks, each of which includes at least one node, wherein each of the portals and networks individually has a clock generator by which time information varies in a predetermined time period of T, wherein one of the portals is a master portal and the others are slave portals, said method comprising the steps of:
   a) detecting a time difference of slave time information of each slave portal with respect to master time information of the master portal;
   b) determining a time adjustment value based on the time difference by referring to a table that includes a predetermined correspondence between time differences and time adjustment values, said time adjustment values having a predetermined step of adjustment, an absolute value of each of said time adjustment values being restricted within a predetermined range, said time adjustment value being an integral multiple of T/M (M is an integer greater than 1); and
   c) adjusting the slave time information by the time adjustment value.

6. The method according to claim 5, wherein a maximum absolute value of the time adjustment values is a minimum value of integral multiples of the predetermined step of adjustment sufficient for adjusting a largest one of frequency deviations in local clocks of the network.

7. The method according to claim 5, wherein, when an absolute value of the time difference exceeds a predetermined threshold, the time adjustment value is set to a predetermined value beyond the predetermined range.

8. A method for synchronizing a bridge network composed of at least one bridge having a plurality of portals each connected to different networks, each of which includes at least one node, wherein each of the portals and networks individually has a clock generator by which time information varies in a predetermined time period of T, wherein one of the portals is a master portal and the others are slave portals, said method comprising the steps of:
   a) each of portals detecting a lowest clock accuracy in a corresponding network;
   b) dynamically determining a maximum adjustment value based on a network-wide lowest clock accuracy selected from lowest clock accuracies detected by the portals;
   c) detecting a time difference of slave time information of each slave portal with respect to master time information of the master portal;
   d) producing a time adjustment value within the dynamically determined maximum adjustment value based on the time difference, wherein the time adjustment value is an integral multiple of T/M (M is an integer greater than 1); and
   e) adjusting the slave time information by the time adjustment value.

9. The method according to claim 5, wherein the master portal functions as a slave node in a corresponding network by the steps of:
   preparing update-possible time points having a period of T/N (N is an integer greater than 1);
   receiving master node time information from a time master node predetermined within the corresponding network; and
   updating its own time information as the master time information using the master node time information at an update-possible time point just after the master node time information has been received.

10. The method according to claim 5, wherein the slave portal functions as a time master node in a corresponding network by periodically notifying its own time information to time slave nodes connected to the corresponding network.

11. The method according to claim 8, wherein the master portal functions as a slave node in a corresponding network by the steps of:
   preparing update-possible time points having a period of T/N (N is an integer greater than 1);
   receiving master node time information from a time master node predetermined within the corresponding network; and
   updating its own time information as the master time information using the master node time information at an update-possible time point just after the master node time information has been received.

12. The method according to claim 8, wherein the slave portal functions as a time master node in a corresponding network by periodically notifying its own time information to time slave nodes connected to the corresponding network.

13. The method according to claim 8, wherein the slave portal functions as a time slave node in a corresponding network by periodically transmitting a time information adjustment packet storing the time adjustment value to the corresponding network.

14. The method according to claim 5, wherein M is equal to 2.

15. The method according to claim 8, wherein M is equal to 2.

16. The method according to claim 5, wherein the bridge network is a serial bus in conformity to IEEE1394 standard, wherein the time information is a value stored in a cycle time register.

17. The method according to claim 8, wherein the network is a serial bus in conformity to IEEE1394 standard, wherein the time information is a value stored in a cycle time register.

18. A storage medium storing a program for causing a computer to execute a processes to synchronize a bridge network, said bridge network including at least one bridge having a plurality of portals each connected to different networks, each of which includes at least one node, wherein each of the portals and networks individually has a clock generator by which time information varies in a predetermined time period of T, wherein one of the portals is a master portal and the others are slave portals, said process comprising the steps of:
   a) detecting a time difference of slave time information of each slave portal with respect to master time information of the master portal;
   b) determining a time adjustment value based on the time difference by referring to a table that includes a predetermined correspondence between time differences and time adjustment values, said time adjustment values having a predetermined step of adjustment, an absolute value of each of said time adjustment values beine restricted within a predetermined range, said time adjustment value being an integral multiple of T/M (M is an integer greater than 1); and c) adjusting the slave time information by the time adjustment value.

19. A storage medium storing a program for causing a computer to execute a process to synchronize a bridge network, said bridge network including at least one bridge having a plurality of portals each connected to different networks, each of which includes at least one node, wherein each of the portals and networks individually has a clock generator by which time information varies in a predetermined time period of T, wherein one of the portals is a master portal and the others are slave portals, said process comprising the steps of:

a) each of portals detecting a lowest clock accuracy in a corresponding network;

b) dynamically determining a maximum adjustment value based on a network-wide lowest clock accuracy selected from lowest clock accuracies detected by the portals;

c) detecting a time difference of slave time information of each slave portal with respect to master time information of the master portal;

d) producing a time adjustment value within the dynamically determined maximum adjustment value based on the time difference, wherein the time adjustment value is an integral multiple of T/M (M is an integer greater than 1); and e) adjusting the slave time information by the time adjustment value.

* * * * *